United States Patent
Ip et al.

(10) Patent No.: US 12,110,052 B2
(45) Date of Patent: Oct. 8, 2024

(54) TRAILER ASSIST SYSTEM WITH JACKKNIFE ESCAPE

(71) Applicant: Continental Automotive Systems, Inc., Auburn Hills, MI (US)

(72) Inventors: Julien Ip, Royal Oak, MI (US); Kyle P. Carpenter, Clarkston, MI (US); Xin Yu, Rochester Hills, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 159 days.

(21) Appl. No.: 17/453,009

(22) Filed: Nov. 1, 2021

(65) Prior Publication Data

US 2023/0136812 A1    May 4, 2023

(51) Int. Cl.
| | |
|---|---|
| B62D 13/06 | (2006.01) |
| B60T 7/20 | (2006.01) |
| B60W 10/184 | (2012.01) |
| B60W 10/20 | (2006.01) |

(52) U.S. Cl.
CPC .............. *B62D 13/06* (2013.01); *B60T 7/20* (2013.01); *B60W 10/184* (2013.01); *B60W 10/20* (2013.01); *B60T 2230/06* (2013.01)

(58) Field of Classification Search
CPC ...... G07C 5/008; G07C 5/085; G07C 5/0808; G07C 5/0825; B60W 50/12; B60W 60/00188; B60W 50/0205; B60W 50/035; B60W 2050/143; B60W 50/14; B60K 2028/006; B60K 28/10; B60R 16/023; G06F 21/55; H04L 12/28; H04L 12/46
See application file for complete search history.

(56) References Cited

U.S. PATENT DOCUMENTS

| | | | |
|---|---|---|---|
| 2012/0271512 A1 | 10/2012 | Rupp et al. | |
| 2016/0031482 A1* | 2/2016 | Lavoie | B60W 30/18036 701/41 |
| 2017/0297619 A1* | 10/2017 | Lavoie | B62D 15/024 |
| 2019/0016382 A1* | 1/2019 | Zarco | G05D 1/0038 |
| 2021/0370922 A1* | 12/2021 | Smith | B60W 60/0016 |
| 2022/0126915 A1* | 4/2022 | Conrad | B60W 50/14 |

FOREIGN PATENT DOCUMENTS

WO        2019040776 A1    2/2019

* cited by examiner

*Primary Examiner* — Peter D Nolan
*Assistant Examiner* — Demetra R Smith-Stewart

(57) ABSTRACT

A trailer assist system includes a controller configured to determine whether a trailer is in a jackknife condition based on an angle of the trailer relative to a vehicle. Determination is made whether the jackknife condition can be corrected by utilizing vehicle brakes, trailer brakes, or vehicle steering.

14 Claims, 3 Drawing Sheets

TRAILER ASSIST SYSTEM WITH JACKKNIFE ESCAPE

TECHNICAL FIELD

The present disclosure relates to a trailer assist system that assists a driver in escaping a jackknife situation.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, or boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. The trailer hitch allows the trailer to swivel around the hitch horizontally so that the vehicle and trailer can move around corners. However, this can pose difficulties when the vehicle is traveling in reverse.

When the vehicle backs up, it pushes the trailer. The backing of trailers attached to vehicles often requires multiple persons to effectively control the vehicle and direct the path of the vehicle and trailer. Those unaccustomed to operating a vehicle towing a trailer may have difficulty in accurately controlling the path of the trailer while backing the vehicle and trailer.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A trailer assist system according to a disclosed example embodiment includes, among other possible things a controller configured to determine whether a trailer is in a jackknife condition based on an angle of the trailer relative to a vehicle. Determination is made whether the jackknife condition can be corrected by utilizing vehicle brakes, trailer brakes, or vehicle steering.

In another embodiment of any of the foregoing trailer assist system, the controller is configured to correct the jackknife condition by utilizing the vehicle brakes, trailer brakes, or vehicle steering.

In another embodiment of any of the foregoing trailer assist system, the controller is configured to autonomously control the vehicle brakes, trailer brakes, and/or vehicle steering when the jackknife condition can be corrected.

In another embodiment of any of the foregoing trailer assist system, the controller is in communication with a left vehicle brake and a right vehicle brake that can be activated separately.

In another embodiment of any of the foregoing trailer assist system, the controller is configured to correct the jackknife condition by braking one of the left vehicle brake and the right vehicle brake.

In another embodiment of any of the foregoing trailer assist system, the controller is configured to correct the jackknife condition by controlling the vehicle brakes and the vehicle steering.

In another embodiment of any of the foregoing trailer assist system, the trailer is in the jackknife condition when an angle between the vehicle and the trailer is above a predetermined threshold.

In another embodiment of any of the foregoing trailer assist system, the determination whether the jackknife condition can be corrected is based on a vehicle steering angle and a speed of the vehicle.

In another embodiment of any of the foregoing trailer assist system, the controller is configured to instruct a driver of the vehicle to stop or drive forward when the jackknife condition cannot be corrected.

In another embodiment of any of the foregoing trailer assist system, the controller is in communication with a plurality of sensors on the vehicle.

A method of controlling a path of a trailer according to another disclosed embodiment includes, among other possible things, determining an orientation of a trailer relative to a vehicle. A determination is made whether the trailer is in a jackknife condition based on the orientation. A determination is made whether the jackknife condition can be corrected by utilizing vehicle brakes, trailer brakes, or vehicle steering.

In another embodiment of any of the foregoing methods, a driver of the vehicle is instructed to stop or drive forward when the jackknife condition cannot be corrected.

In another embodiment of any of the foregoing methods, the jackknife condition is corrected by utilizing the vehicle brakes, trailer brakes, or vehicle steering.

In another embodiment of any of the foregoing methods, both the vehicle brakes and the vehicle steering are controlled in the correcting step.

In another embodiment of any of the foregoing methods, the vehicle brakes comprises a left brake and a right brake that can be controlled separately.

In another embodiment of any of the foregoing methods, the method includes activating one of the left brake and the right brake.

In another embodiment of any of the foregoing methods, the vehicle brakes, trailer brakes, or vehicle steering are controlled autonomously by a controller when the jackknife condition can be corrected.

A non-transitory computer readable medium including instructions is executable by at least one processor according to another example embodiment includes, among other possible things, instructions executed by the at least one processor that prompt determining an orientation of a trailer relative to a vehicle. Instructions are executed by the at least one processor that prompt determining whether the trailer is in a jackknife condition based on the orientation. Instructions executed by the at least one processor to prompt determining whether the jackknife condition can be corrected by utilizing vehicle brakes, trailer brakes, or vehicle steering.

Another embodiment of the foregoing non-transitory computer readable medium further includes instructions executed by the processor for correcting the jackknife condition by activating the vehicle brakes, trailer brakes, or vehicle steering.

Another embodiment of the foregoing non-transitory computer readable medium further includes instructions executed by the processor for activating one of a left brake and a right brake on the vehicle.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
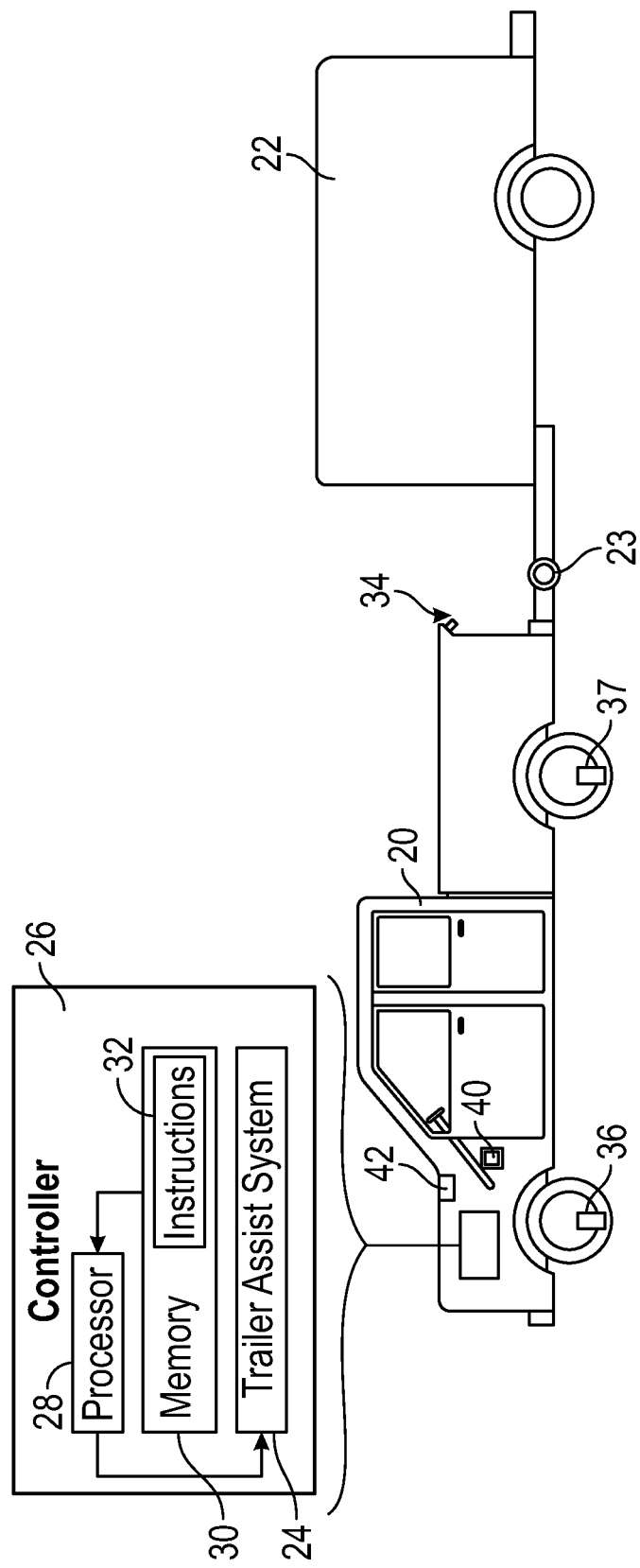
FIG. 1 is a schematic side view of a vehicle and trailer with an example embodiment of a trailer assist system.

FIG. 1 schematically illustrates a tow vehicle 20 attached to a trailer 22 at a hitch 23. The tow vehicle 20 includes a system 24 for assisting a driver in backing the trailer 22. Backing a trailer is one of the most challenging maneuvers for a driver. A driver must steer the tow vehicle 20 in a manner that directs the trailer 22 along a desired intended path. Steering of the tow vehicle 20 to direct the trailer 22 is not intuitive and therefore presents challenges for most drivers.

When operating in reverse, the vehicle 20 pushes the trailer 22. The steering controls for pushing the trailer 22 in reverse are opposite, which can be tricky. When the trailer gets to a certain maximum angle relative to the vehicle 20, there is no way to straighten the trailer 22 with steering alone. When the trailer 22 is at or above this maximum angle, it is known as a jackknife condition or jackknife situation. In these situations, a driver typically must stop and move the vehicle 20 forward. The disclosed vehicle 20 has a trailer assist system 24 to help the driver escape jackknife situations. The trailer assist system 24 described herein is used to escape the jackknife situation using vehicle steering, vehicle brakes, and trailer brakes.

Figure 2:
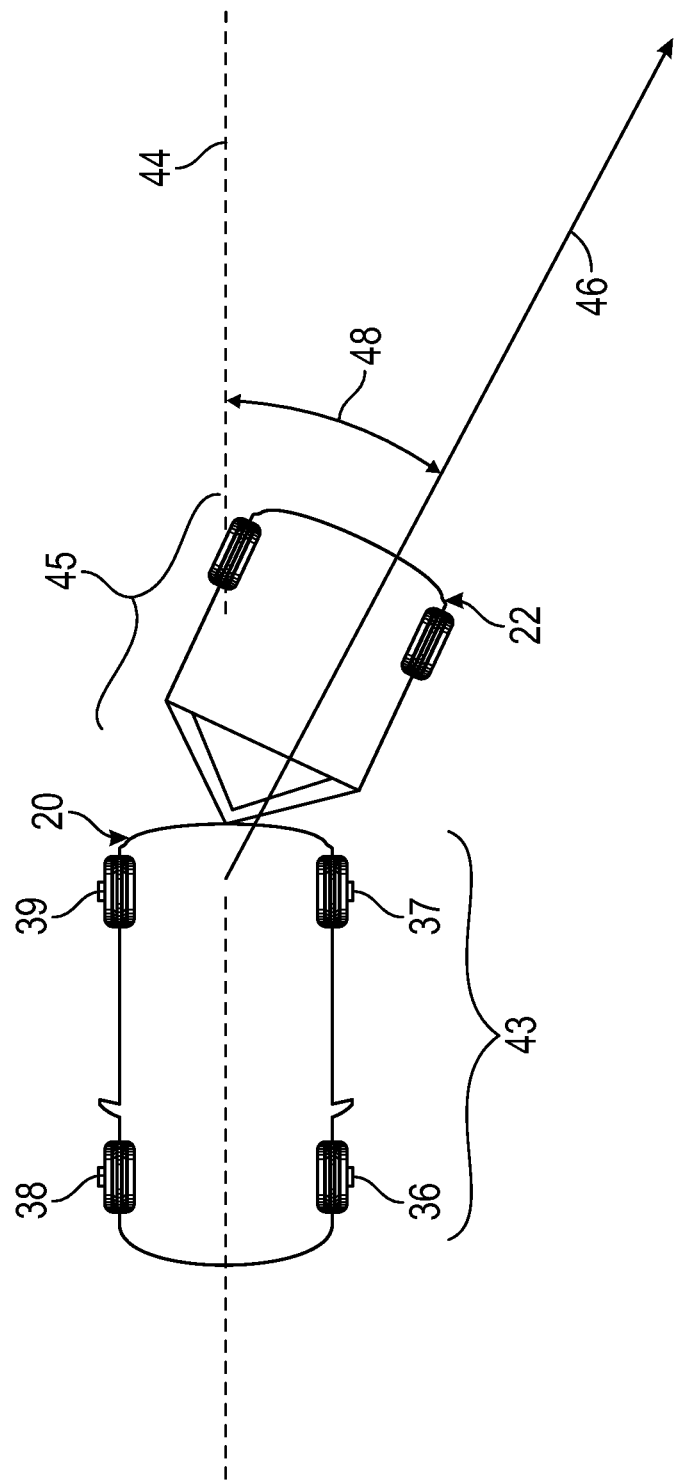
FIG. 2 is a schematic top view of the vehicle and trailer with the example trailer assist system.

With reference to FIG. 2, and continuing reference to FIG. 1, the vehicle 20 has a midline 44 that extends longitudinally through the vehicle 20. The trailer 22 has a midline 46 that extends longitudinally through the trailer 22. Sometimes, the trailer 22 may be at an angle 48 relative to the vehicle 20. The angle 48 may be the angle between the vehicle midline 44 and the trailer midline 46. When the angle 48 exceeds a predetermined jackknife threshold, the trailer 22 is in a jackknife situation. Typically, in a jackknife situation, the angle 48 will only increase as the vehicle 20 continues travelling in reverse. The predetermined jackknife threshold depends upon the length 43 of the vehicle 20 and the length 45 of the trailer 22.

The position of the trailer 22, the angle 48, and other vehicle parameters such as speed and steering angle are detected with several vehicle sensors. A sensor 34 at the tow hitch 23 may detect information about the trailer 22, such as the angle 48. The sensor 34 may be a radar detector or camera, for example. A steering wheel sensor 40 may provide an indication of an angle of the front wheels. The angle of the front wheels provides the data needed to determine the direction of the vehicle 20. A radar device and/or an accelerometer 42 could be utilized or combined with data from other sensors to determine the direction of the tow vehicle 20. Moreover, it should be understood that although several vehicle sensing devices are disclosed by way of example, any other sensing devices and systems that can provide information indicative of a vehicle direction could also be utilized and are within the scope and contemplation of this disclosure.

Each of the sensors 34, 40, 42 are in communication with a controller 26. The controller 26 includes the trailer assist system 24. The trailer assist system 24 determines whether the vehicle 20 and trailer 22 are in a jackknife situation. If the vehicle 20 and trailer 22 are in a jackknife situation, the trailer assist system 24 helps a driver to escape the jackknife situation by controlling vehicle brakes, trailer brakes, and/or vehicle steering, as will be further described below. The controller also includes a processor 28 and a memory device 30. The memory device 30 includes a set of instructions 32 executed by the processor 28.

The example disclosed processor 28 may be a hardware device for executing software, particularly software stored in memory. The processor 28 can be a custom made or commercially available processor, a central processing unit (CPU), an auxiliary processor among several processors associated with the computing device, a semiconductor based microprocessor (in the form of a microchip or chip set) or generally any device for executing software instructions.

The memory 30 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 30 may incorporate electronic, magnetic, optical, and/or other types of storage media. Note that the memory 30 can also have a distributed architecture, where various components are situated remotely from one another, but can be accessed by the processor 28.

The software instructions 32 in the memory 30 may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory 30.

The memory device 30 provides a non-transitory computer readable medium for storage of processor executable software instructions 32. The instructions 32 direct the processor 28 to determine an orientation of the trailer 22 relative to the tow vehicle 20. The instructions 32 further prompt the processor to determine whether the vehicle 20 and trailer 22 are in a jackknife situation. If the vehicle 20 and trailer 22 are in a jackknife situation, the instructions 32 further prompt operation of the processor 28 to determine how to escape the jackknife situation and communicates to the trailer assist system 24.

The trailer assist system 24 may help a driver to escape a jackknife situation by controlling the vehicle brakes, the trailer brakes, and/or the vehicle steering. The vehicle 20 has a braking device 36, 37, 38, 39 at each wheel. In this example, the braking devices 36, 37 are arranged on a right side of the vehicle and the braking devices 38, 39 are arranged on a left side of the vehicle 20. The right side braking devices 36, 37 can be controlled independently of the left side braking devices 38, 39. Although four braking devices 36, 37, 38, 39 are shown, two braking devices on opposite sides of the vehicle 20 could be used in some examples. By braking the left or right side of the vehicle 20, the turn radius of the vehicle 20 is decreased. This may allow the vehicle 20 to escape a jackknife situation without needing to stop or drive forward. In some examples, the trailer 22 has brakes on the left and right sides that are individually controlled. The trailer assist system 24 may also help escape a jackknife situation by controlling brakes on the trailer 22.

Figure 3:
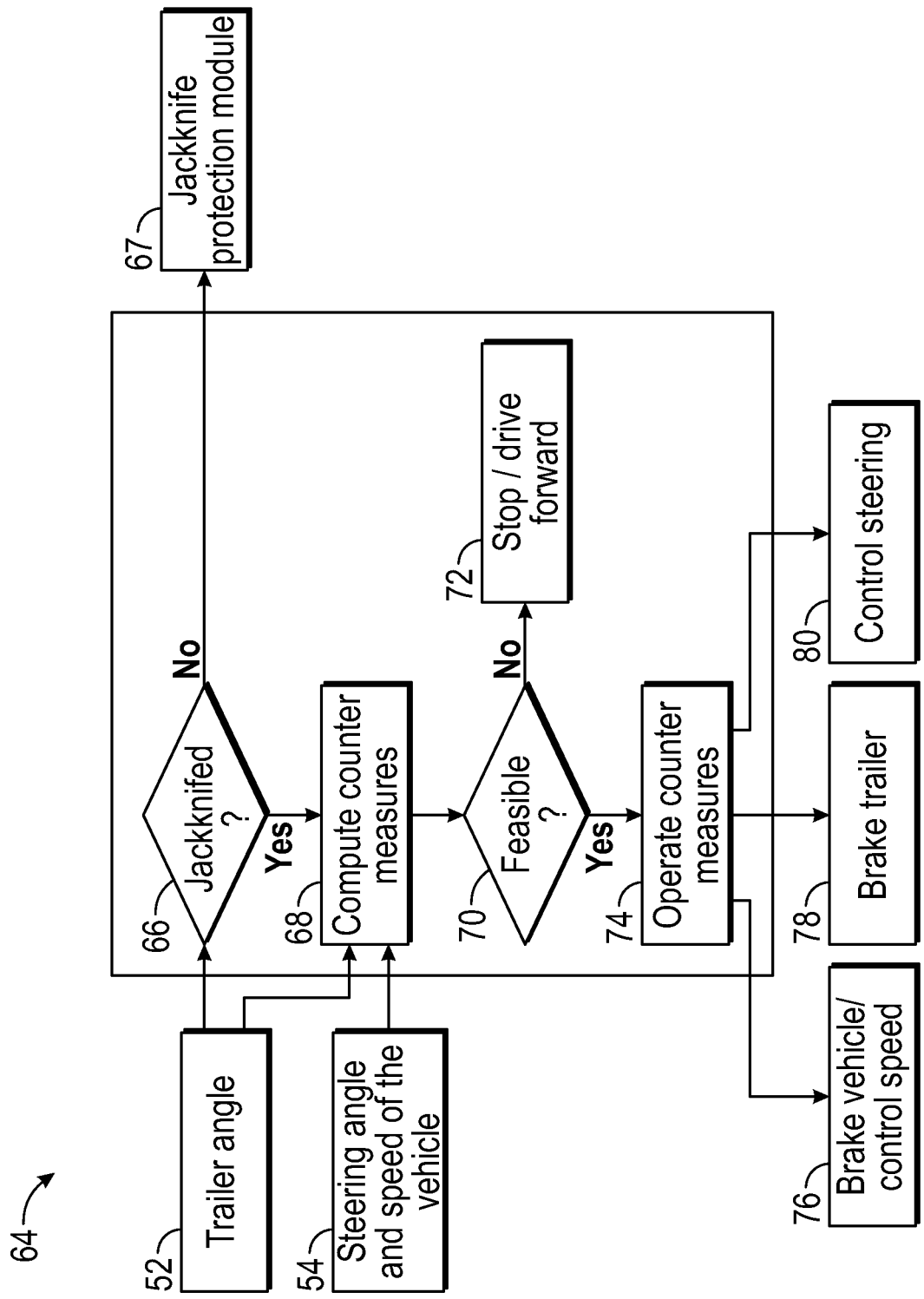
FIG. 3 is a flow diagram of example steps performed by the example trailer assist system.

Referring to FIG. 3 with continued reference to FIGS. 1 and 2, a flow diagram of example operation of a disclosed system embodiment is shown and generally indicated at 64.

Operation begins with a determination of an angle 48, or orientation of the trailer relative to the tow vehicle 20 at 52. The angle 48 may be determined with data from a sensor at the tow hitch or a camera or radar device 34, for example. The angle 48 is compared with a predetermined jackknife angle at 66. The predetermined jackknife angle is the maximum angle before the trailer 22 is in a jackknife situation. The predetermined jackknife angle is determined for a particular vehicle 20 and trailer 22 based on the lengths 43, 45 of the vehicle 20 and trailer 22, respectively. If the angle 48 is less than the predetermined jackknife angle, the trailer 22 is not in a jackknife situation.

In some examples, the vehicle 20 may be equipped with a jackknife protection module 67. The jackknife protection module 67 helps to prevent the trailer from being in a jackknife situation. If the trailer 22 is determined to not be in a jackknife situation at 66, the jackknife protection module 67 will be operating.

If the trailer 22 is determined to be in a jackknife situation at 66, the system then determines possible counter measures at 68. The countermeasures 68 are determined using the trailer angle 48 and other vehicle information 54, such as steering angle and speed. The system then determines whether it is feasible to escape the jackknife situation via the countermeasures at 70. If it is not possible to escape the jackknife situation via the countermeasures, the vehicle 20 must stop and/or drive forward at 72. The step 72 may automatically stop the vehicle, or may instruct the driver to stop and drive forward. The driver may be instructed via an audible alert and/or visual indication on a screen in the cab of the vehicle 20, for example.

If it is possible to escape the jackknife situation via the countermeasures, then the countermeasures are activated at 74. The countermeasures may include braking the vehicle 76, braking the trailer 78, or controlling steering 80. One or any combination of these countermeasures may be used to escape the jackknife situation. The countermeasures 76, 78, 80 may be activated autonomously or partially autonomously, in some examples.

In one example, the countermeasures of braking the vehicle 76 and braking the trailer 78 include activating braking devices separately. That is, for example, activating only the left brake devices 36, 37 or the right brake devices 38, 39. This may decrease the turning radius of the vehicle 20 and allow it to escape some jackknife situations.

Some known jackknife systems assist a driver in avoiding a jackknife situation. However, the disclosed system helps a driver escape a jackknife situation once they are in such a situation. The disclosed system utilizes vehicle parameters, trailer parameters, or a combination of both to escape jackknife situations.

In this disclosure, the relative directions of forward and rear or reverse are used in reference to the direction which an operator of the vehicle 20 would typically be facing when driving the vehicle 20.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A trailer assist system comprising:
a controller comprising at least one processor configured to:
determine whether a trailer is in a jackknife condition based on an angle of the trailer relative to a vehicle connected to the vehicle, as the vehicle moves in a reverse direction, wherein the trailer is in the jackknife condition when an angle between the vehicle and the trailer is above a predetermined threshold at which the angle cannot be decreased through steering of the vehicle while reversing alone;
responsive to an affirmative determination that the trailer is in the jackknife condition, determine whether the jackknife condition can be corrected with the vehicle moving in the reverse direction and without moving in a forward direction, by utilizing at least one of vehicle brakes, trailer brakes, or vehicle steering during movement in the reverse direction, determining whether the jackknife condition can be corrected comprising determining whether one or more countermeasures is feasible for the vehicle with the vehicle moving in the reverse direction and without moving in the forward direction;
responsive to an affirmative determination by the controller that the jackknife condition can be corrected, correct the jackknife condition by utilizing at least one of the vehicle brakes, trailer brakes, or vehicle steering during the movement in the reverse direction; and
responsive to a determination by the controller that the jackknife condition cannot be corrected with the vehicle moving in the reverse direction and without moving in the forward direction, send a command to a display screen in the vehicle to instruct a driver of the vehicle to at least one of stop or drive in the forward direction.

2. The trailer assist system as recited in claim 1, wherein the controller is configured to autonomously control the at least one of the vehicle brakes, trailer brakes, or vehicle steering when the jackknife condition can be corrected.

3. The trailer assist system as recited in claim 1, wherein the controller is in communication with a left vehicle brake and a right vehicle brake, each left and right vehicle brake being activated separately.

4. The trailer assist system as recited in claim 3, wherein the controller is configured to correct the jackknife condition by braking only one of the left vehicle brake or the right vehicle brake.

5. The trailer assist system as recited in claim 1, wherein the controller is configured to correct the jackknife condition by controlling the vehicle brakes and the vehicle steering.

6. The trailer assist system as recited in claim 1, wherein the determination whether the jackknife condition can be corrected is based on a vehicle steering angle and a speed of the vehicle.

7. The trailer assist system as recited in claim 1, wherein the controller is in communication with a plurality of sensors on the vehicle.

8. A method of controlling a path of a trailer comprising:
determining, by a controller including at least one processor, an orientation of a trailer relative to a vehicle to which the trailer is connected as the vehicle moves in a reverse direction;
determining, by the controller, whether the trailer is in a jackknife condition based on the orientation, wherein the trailer is in the jackknife condition when an angle between the vehicle and the trailer is above a predetermined threshold at which the angle cannot be decreased through steering of the vehicle while reversing alone;
responsive to an affirmative determination at the trailer is in the jackknife condition determining, by the controller, whether the jackknife condition can be corrected with the vehicle moves in the reverse direction without the vehicle moving in a forward direction, by utilizing at least one of vehicle brakes, trailer brakes, or vehicle steering, determining whether the jackknife condition can be corrected comprising determining whether one or more countermeasures is feasible for the vehicle with the vehicle moving in the reverse direction without moving in the forward direction;
upon a determination by the controller that the jackknife condition cannot be corrected, sending, by the controller, at least one command to a display in the vehicle for instructing a driver of the vehicle to at least one of stop or drive in the forward direction; and
upon a determination by the controller that the jackknife condition can be corrected, correcting, by the controller, the jackknife condition by utilizing the at least one of the vehicle brakes, trailer brakes, or vehicle steering as the vehicle moves in the reverse direction.

9. The method as recited in claim 8, wherein both the vehicle brakes and the vehicle steering are controlled in correcting the jackknife condition.

10. The method as recited in claim 8, wherein the vehicle brakes comprises a left brake and a right brake, each left and right brake being controlled separately.

11. The method as recited in claim 10, further comprising activating only one of the left brake or the right brake.

12. The method as recited in claim 8, wherein the vehicle brakes, trailer brakes, or vehicle steering are controlled autonomously by the controller when the jackknife condition can be corrected.

13. A non-transitory computer readable medium including instructions executable by at least one processor, the instructions comprising:
instructions executed by the at least one processor that prompt determining an orientation of a trailer relative to a vehicle to which the trailer is connected and as the vehicle and the trailer move in a reverse direction;
instructions executed by the at least one processor that prompt determining whether the trailer is in a jackknife condition based on the orientation, wherein the trailer is in the jackknife condition when an angle between the vehicle and the trailer is above a predetermined threshold at which the angle cannot be decreased through steering of the vehicle while reversing alone;
instructions executed by the at least one processor to prompt, responsive to an affirmative determination that the trailer is in the jackknife condition, determining whether the jackknife condition can be corrected without the vehicle and the trailer moving in a forward direction, by utilizing at least one of vehicle brakes, trailer brakes, or vehicle steering, determining whether the jackknife condition can be corrected comprising determining whether one or more countermeasures is feasible for the vehicle without moving in the forward direction;
instructions executed by the at least one processor for, in response to a determination that the jackknife condition can be corrected, correcting the jackknife condition by activating the at least one of vehicle brakes, trailer brakes, or vehicle steering; and
instructions executed by the at least one processor for, in response to a determination that the jackknife condition cannot be corrected, sending at least one command to a display in the vehicle for instructing a driver of the vehicle to at least one of stop or drive in the forward direction.

14. The non-transitory computer readable medium as recited in claim 13, wherein activating the vehicle brakes comprises activating only one of a left brake and a right brake on the vehicle.

* * * * *